United States Patent [19]
Utsumi et al.

[11] 3,774,102
[45] Nov. 20, 1973

[54] AUTOMATIC NUCLEAR-MAGNETIC-RESONANCE POSITIONING APPARATUS

[76] Inventors: Yoshiharu Utsumi, 1182, Ichige; Noriyuki Matsubayashi, 1030, Ichige, both of Katsuta, Japan

[22] Filed: Dec. 29, 1971

[21] Appl. No.: 213,460

[30] Foreign Application Priority Data
Dec. 29, 1970 Japan.............................. 45/128536

[52] U.S. Cl.............................................. 324/0.5 R
[51] Int. Cl............................................. G01n 27/78
[58] Field of Search...................... 324/0.5 R, 0.5 A, 324/0.5 AC, 0.5 AH, 0.5 MA

[56] References Cited
UNITED STATES PATENTS
3,113,264  12/1963  Parker.............................. 324/0.5 R
3,137,813  6/1964  Kroon.............................. 324/0.5 R

*Primary Examiner*—Michael J. Lynch
*Attorney*—Craig, Antonelli & Hill

[57] ABSTRACT

Nuclear-magnetic-resonance positioning apparatus for automatically calibrating a reference line on a recording paper with a specimen to be analyzed containing a standard substance. The apparatus includes means for detecting the distance between the resonance center line of the standard substance and the reference line of the recording paper and providing a DC magnetic field corresponding to this distance as a bias for the swept DC magnetic field utilized in the spectral analysis of the specimen. Namely, a wiper of a potentiometer is mechanically rotated to an angle corresponding to the distance and a bias signal of the potentiometer is applied to the coil which applies the magnetic field to the specimen.

8 Claims, 3 Drawing Figures

PATENTED NOV 20 1973

3,774,102

INVENTORS
YOSHIHARU UTSUMI,
NORIYUKI MATSUBAYASHI

BY Craig, Antonelli & Hill

ATTORNEYS

AUTOMATIC NUCLEAR-MAGNETIC-RESONANCE POSITIONING APPARATUS

The present invention relates to an apparatus for the automatic positioning or calibration of a reference line on a recording paper in nuclear magnetic resonance apparatus.

In hydrogenous nuclear magnetic resonance of high resolution, the spacing between the resonant line of a standard substance incorporated as an internal standard and a measured resonant line is indicated by the rate (ppm) of change in a swept DC magnetic field, which rate is termed the "chemical shift". For hydrogenous nuclear resonance, tetramethylsilane is generally used as the standard substance for comparison purposes.

When nuclear-magnetic-resonance spectra are recorded on recording paper by applying a high-frequency magnetic field of a fixed frequency and a swept DC magnetic field to a specimen to be measured with the standard substance incorporated thereto, the resonant line of the standard substance does not always appear at the position of an identical DC magnetic field, but is generally slightly deviated in position. This is because the volume susceptibilities of the respective specimens including specimen tubes differ from one another, and hence, true magnetic fields to which atomic nuclei in the specimens are subjected vary slightly. In this case, it is very convenient for the spectroscopic analysis if the recording is made with the resonant line of the standard substance being brought into coincidence with the reference line on the spectra recording paper. This is called the "calibration chart system".

The calibration chart system, or the positioning operation for bringing the position of the resonant line of the standard substance into coincidence with the reference line on the recording paper, has heretofore been carried out by a manual and time consuming operation.

It is therefore an object of the present invention to provide a nuclear-magnetic-resonance apparatus which eliminates the need for manual positioning or calibration.

It is another object of the present invention to provide a nuclear-magnetic-resonance apparatus which automatically performs the positioning or calibration of the apparatus for spectral recording.

In accordance with an embodiment of the present invention, the automatic nuclear-magnetic-resonance apparatus includes recording paper having a predetermined reference line thereon and in order to make the resonance center line of the standard substance coincide with the predetermined reference line position on the paper, means are provided for detecting the distance between the resonance center line and the reference line on the recording paper in the form of a voltage corresponding to the distance. A wiper of a potentiometer is rotated mechanically together with the recording of the resonance center line and the angular position of the wiper corresponds to the distance and the current supply provides, as a bias, a current corresponding to an output of the potentiometer in a coil which applies the magnetic field to a specimen.

These and further objects, features and advantages of the present invention will become more obvious from the following description when taken in connection with the accompanying drawing which shows for purposes of illustration, one embodiment in accordance with the present invention, and wherein.

Figure 1:
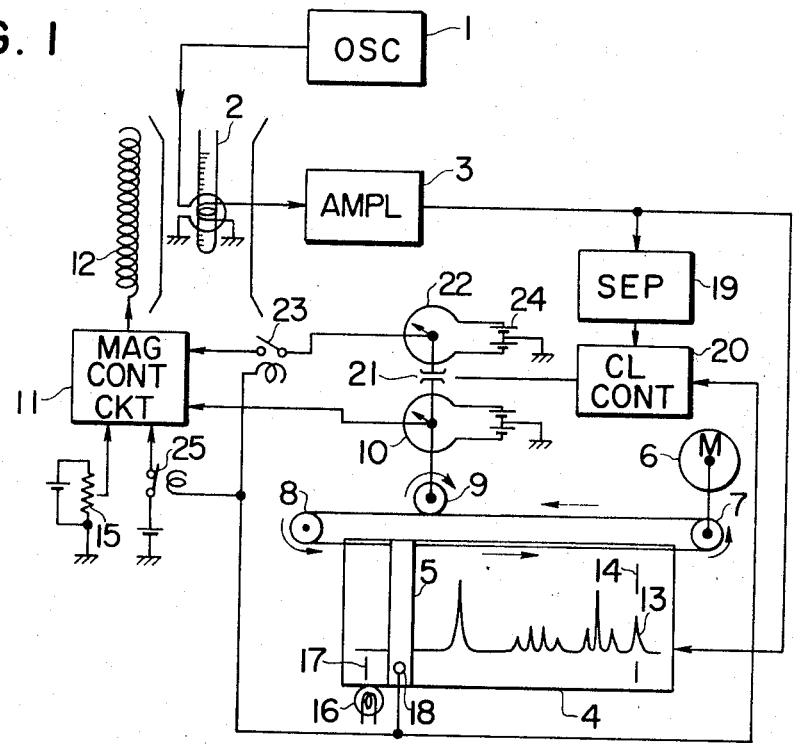
FIG. 1 is a somewhat schematic view of the present invention.

Referring now to the drawing, there is shown in FIG. 1, a high-frequency oscillator 1 of a fixed frequency, e.g. 60 MHz, by means of which a high-frequency magnetic field is applied to a specimen 2 which is placed in a DC magnetic field of, for example, 14,100 gauss generated by a magnet. When the strength of the DC magnetic field is swept in such a way that a DC current fed to the magnet coil 12 is varied, signals induced by the resonance of hydrogenous nuclei in the specimen are supplied via an amplifier 3 and are recorded as spectra on recording paper 4 of a recorder.

In the recording operation, a pen 5 of the recorder is swept toward the right in the drawing with the sweep being controlled by a motor 6, which is coupled via coupling strings to pulleys 7, 8 and 9. The pulley 9 is connected to a rotor of a potentiometer 10. A voltage produced in the potentiometer 10 supplies a DC current to the magnet coil 12 via a magnet control circuit 11. In this manner, the sweep or variation of the strength of the DC magnetic field and the pen 5 of the recorder are interlocked with each other.

In the prior art arrangements having manual operation of the above-described system, the calibration is carried out by manually adjusting a potentiometer 15 so that a resonant line 13 of a standard substance coincides with a reference line 14 on the recording paper. Thus, the strength of the swept DC magnetic field is manually adjusted for every specimen. More specifically, if the specimen is exchanged, the position of the resonant line 13 is slightly shifted due to variations in specimen tubes and the like. Therefore, at each exchange, the potentiometer 15 is adjusted to perform the desired positioning or calibration.

In accordance with the present invention, the positioning operation is not carried out by adjustment of the potentiometer 15, but is automatically effected by apparatus including a lamp 16 which provides a light for irradiating a mark in the form of a slit 17 provided at a specified position on the recording paper. When the light passes through the slit and falls upon a photosensitive element 18 disposed on the pen rider 5, a signal is generated. As shown in FIG. 1, the apparatus also includes a separator 19 for separating resonance dispersion components of the spectral signal and a clutch controller 20 which is actuated by a signal from the separator 19. More specifically, when the separator 19 determines that the swept magnetic field has passed through the center line of the resonance signal, an output signal is provided for actuating the clutch controller 20 which operates a clutch 21 which is self-maintained in the operative condition. The clutch 21 serves for connecting a potentiometer 22 to the pulley 9 such that with rotation of the pulley in accordance with the sweep, a wiper of the potentiometer 22 is rotated, and a DC voltage is generated in the wiper. When the photosensitive element 18 passes over the light slit 17, a relay 23 is energized by the output signal from the photosensitive element 18 and the relay self-maintained in the energized condition. Simultaneously therewith, the clutch control circuit 20 is actuated by the output signal from element 18 for disengaging the clutch 21. As a result, a DC voltage proportional to the revolutional angle of the wiper of the potentiometer 22 is stored in the potentiometer. The stored voltage value is applied to the magnet control circuit 11 via the relay 23 such that the magnet coil 12 has a DC bias current added thereto which serves for shifting the spectral position.

The apparatus of the present invention also includes a relay 25 for applying to the magnet control circuit 11 a DC magnetic-field change voltage which corresponds to the spacing between a reference line 14 on the recording paper and the slit 17. When the photosensitive element 18 is located to the left of the light slit 17, the relay 25 is in the closed state and is self-maintained in this condition. Simultaneously with the passage of the photosensitive element over the light slit 17, the relay 25 is opened and changes the swept DC magnetic field.

Figure 2:
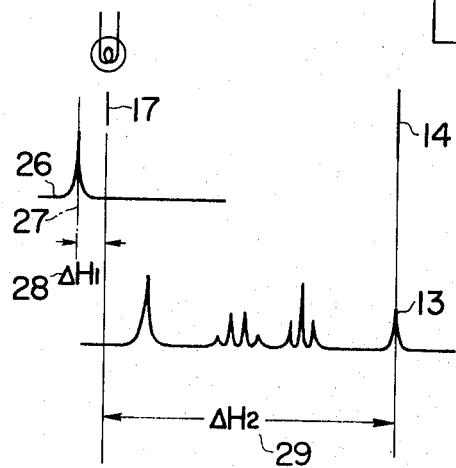
FIG. 2 is an enlarged view of the recording means of FIG. 1.

The operation of the automatic calibration apparatus will now be described in more detail with reference to FIG. 2. As shown in this figure, a resonant line 26 corresponds to a preparatory measurement before the spectral recording and upon detection of the resonant line, the clutch 21 is energized via the separator 19 and clutch control 20. The relay 25 is in the closed state and the potentiometer wiper 22 of FIG. 1 starts rotation at the central position 27 of the resonant line and when the photosensitive element 18 passes through the position of the light slit 17, the clutch 21 is disengaged and the rotation of the wiper 22 is stopped. In this case, a magnetic field bias voltage equivalent to $H_1$ as shown at 28 is obtained as the revolutional angle of the wiper 22. The term $\Delta H_2$ shown at 29 in the drawing represents a moving width of the recording paper as caused by the DC magnetic field strength change due to the opening and closure of the relay 25 in FIG. 1, and is made the voltage equivalent of the spacing between the reference line 14 on the recording paper and the light slit 17. In this manner the bias voltage to be applied is obtained in a preliminary calibration measurement. Thus, the spectral recording is started from a point at which the photosensitive element 18 has passed through the light slit 17 and is carried out by sweeping the pen rider 5 to the right. During the spectral recording, the clutch 21 is in the disengaged state, the relay 23 is in the closed state, and the relay 25 is in the open state. Consequently, the resonance center line 13 of the standard substance and the reference line 14 of the recording paper always coincide at the end of the spectral recording.

Figure 3:
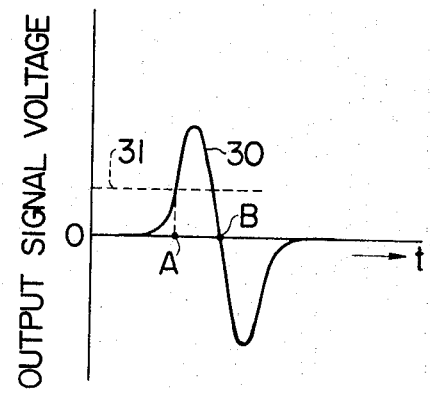
FIG. 3 is a graph illustrating the operation of the separator of FIG. 1.

FIG. 3 is a diagram for explaining the manner in which the resonance center line may be determined by the separator 19. The dispersion components of the resonant line have a shape as at 30 in this figure. Accordingly, the resonance center position may be discriminated such that when a DC component of the dispersion mode of the resonance signal exceeds a predetermined level 31 on the positive side at point A and subsequently arrives at the zero level at point B, an output signal is generated by the separator. An electric circuit for carrying out such discrimination may be constituted by utilizing two voltage comparators and a gate circuit.

It can be seen that in accordance with the present invention, the positioning or calibration operation for bringing the resonant line of a standard substance into coincidence with the reference line of spectra recording paper is automatically effected whereby the disadvantages of the manual and time consuming procedures utilized especially in spectroscopic analysis are overcome.

It should be noted that while in the aforedescribed embodiment, the description has been directed to the method of effecting the sweep with the high-frequency magnetic field kept at a fixed frequency and with the strength of the DC magnetic field being varied, the method of varying the frequency of the high-frequency magnetic field is also utilized in the principle of the nuclear magnetic resonance and may be achieved with the present apparatus. In addition, while the measurement and storage of the quantity of correction and $H_1$ in FIG. 2 are made in the present embodiment by the combined use of the potentiometer wiper 22 and the clutch 21, the measurement and storage may also be accomplished with other electrical means such as an electrical integrator.

Obviously, many modifications and variations of the present invention are possible in the light of the above teachings. It should therefore be understood that within the scope of the appended claims, the invention may be practiced otherwise than as specifically described.

We claim:

1. In an apparatus for recording nuclear-magnetic-resonance spectral signals wherein a specimen to be analyzed has a standard substance incorporated therein, an automatic nuclear-magnetic-resonance positioning apparatus comprising recording means having a recording medium for recording the spectrum of the nuclear-magnetic-resonance, writing means for writing the spectrum on the medium, and driving means for moving said writing means, said recording medium having marks thereon, means for applying a predetermined frequency signal to said specimen, magnetic sweeping means for applying a DC magnetic field to said specimen and for varying the DC magnetic field in accordance with the movement of said writing means, means for shifting the resonance position of the standard substance with respect to said marks of said recording medium, means for measuring the resonance spectrum of said specimen and standard substance and for applying said spectrum to said recording means, means for storing a signal value corresponding to the deviation of the resonance center line of the standard substance from one of said marks of said recording medium and for applying the signal value as a bias during the spectral analysis of the specimen to ensure proper positioning of the spectral response of the specimen on said recording medium, first detecting means for detecting the resonance peak of the standard substance and for providing an output signal for controlling the operation of said storing means in response thereto, and second detecting means for detecting said writing means passing one of said marks of said recording medium and providing an output signal for controlling the operation of said shifting means and the application of the signal value of said storing means to said magnetic sweeping means as a bias.

2. Apparatus according to claim 1, wherein said first detecting means is responsive to a DC component of a dispersion mode of the resonance signal from said measuring means first exceeding a predetermined signal level and the subsequent arrival of the component at the zero signal level for providing the output signal.

3. Apparatus according to claim 1, wherein said recording medium is a recording paper, and the marks being in the form of a slit in the recording paper and a reference line on the paper.

4. Apparatus according to claim 3, wherein said means for measuring and storing a deviation signal value includes a potentiometer having a rotatable wiper movable in accordance with the writing means of said recording means, the movement of the wiper being started in response to the output of said first detecting means and being stopped in response to the output of said second detecting means, the rotational angle of the wiper corresponding to the deviation of the resonance center line from one of the marks of the recording paper.

5. Apparatus according to claim 1, wherein said recording medium is a recording paper having a first mark in the form of a slit and a second mark corresponding to a reference line spaced a predetermined distance therefrom corresponding to the sweep width for achieving resonance of the standard substance.

6. Apparatus according to claim 5, wherein said first detecting means includes means responsive to a DC component of a dispersion mode of the resonance signal first exceeding a predetermined signal level and the subsequent arrival of the component of the zero signal level for providing an output signal.

7. Apparatus according to claim 6, wherein said magnetic sweeping means includes magnetic coil means, first potentiometer means having a wiper arranged for movement with said driving means of said recording means for providing a varying signal to said magnetic coil means, and said storing means includes second potentiometer means having a wiper, and clutch control means responsive to the output of said first detecting means for activating a clutch for engaging the wiper of said second potentiometer means for movement with said writing means, said clutch control means being responsive to the output of said second detecting means for deactivating said clutch.

8. Apparatus according to claim 7, wherein said second detecting means includes light means for irradiating said slit in said recording paper and photosensitive means carried by said writing means and positioned for movement over said slit, said photosensitive means being responsive to the irradiation of said slit when said writing means passes thereover for providing an output signal.

* * * * *